United States Patent
Ono et al.

(10) Patent No.: US 7,092,411 B2
(45) Date of Patent: Aug. 15, 2006

(54) TRANSPORT STREAM MULTIPLEXING METHOD, TRANSPORT STREAM MULTIPLEXING APPARATUS, AND STORAGE AND REPRODUCTION SYSTEM

(75) Inventors: Masahiro Ono, Tokyo-to (JP); Atsushi Inazumi, Tokyo-to (JP); Kazutoshi Adachi, Tokyo-to (JP); Daisuke Tanaka, Tokyo-to (JP); Hiroshi Saito, Tokyo-to (JP); Kumiko Atsuta, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 1007 days.

(21) Appl. No.: 10/020,177

(22) Filed: Dec. 18, 2001

(65) Prior Publication Data

US 2002/0085592 A1 Jul. 4, 2002

(30) Foreign Application Priority Data

Dec. 28, 2000 (JP) ............................. P2000-402546

(51) Int. Cl.
*H04J 3/04* (2006.01)
(52) U.S. Cl. .................................................... 370/535
(58) Field of Classification Search ............... 370/535, 370/537, 389, 465, 391, 395.65, 474, 540, 370/541, 527, 528, 529; 725/87, 98; 379/93.14; 375/376, 359, 368, 222, 354
See application file for complete search history.

(56) References Cited

U.S. PATENT DOCUMENTS 5,481,543 A 1/1996 Veltman 6,356,567 B1 * 3/2002 Anderson et al. ........... 370/516
2003/0206605 A1* 11/2003 Anderson .................. 375/355

FOREIGN PATENT DOCUMENTS

| EP | 0 782 137 A | 7/1997 |
| EP | 0 881 838 A | 12/1998 |

OTHER PUBLICATIONS

Patent Abstracts of Japan, vol. 1999, No. 14, Dec. 22, 1999 & JP 11 252058A (Sony Corp.).
Mechanisms of MPEG Stream Synchronization, G. J. Lu, H. . Pung and T. S. Chua, Computer Communications Review, pp. 57-67.
Continuity and Synchronization in MPEG, P. Venkat Rangan, IEEE Journal on Selected Areas in Communications—Jan. 1996.

* cited by examiner

*Primary Examiner*—Dang Ton
(74) *Attorney, Agent, or Firm*—Sughrue Mion, PLLC (57) ABSTRACT

When forming an MPEG-TS (transport stream) containing access units which are units of access of MPEG data, transfer timing is controlled in a transfer timing control section under control of a transfer control section. Access units are thus sent as TS packets from an access unit transfer processing section. A new PTS(Presentation Time Stamp) is embedded in a PES header supplied from a PES header transfer control section, by a PTS embedding section. A TS packet sequence containing both of them is formed by a reproduction buffer. On the other hand, a PCR(Program Clock Reference) serving as a time reference is embedded in a TS packet supplied from a PCR transfer control section and a resultant TS packet is sent to a PCR buffer, by a PCR embedding section on the basis of a STC(System Time Clock) supplied from an STC section. The TS packets are multiplexed as a TS packet sequence to form an MPEG-TS, by a TS multiplexing section.

15 Claims, 7 Drawing Sheets

TRANSPORT STREAM MULTIPLEXING METHOD, TRANSPORT STREAM MULTIPLEXING APPARATUS, AND STORAGE AND REPRODUCTION SYSTEM

BACKGROUND OF THE INVENTION

1. Field of the Invention

The present invention relates to technical fields of a transport stream multiplexing method for multiplexing encoded data and forming a transport stream, a transport stream multiplexing apparatus, and a storage and reproduction system for conducting storage and reproduction of a transport stream thus multiplexed.

2. Description of Related Art

In recent years, digital broadcasting in which video data and audio data are digitized and multiplex-transmitted is spreading. In such digital broadcasting, the MPEG (Moving Picture Expert Group) system is adopted as a compression coding system. In digital broadcasting using the MPEG system, data of a plurality of programs are multiplexed into an MPEG transport stream (hereafter referred to as MPEG-TS) and the MPEG transport stream is transmitted. Upon receiving this, the reception system side selectively extracts desired data. Furthermore, if a storage and reproduction system is formed so as to store arbitrary data contained in MPEG-TS by using a large capacity storage device such as a hard disk, it becomes possible to reproduce stored data at timing desired by the user.

By the way, in the case where video data stored in a storage device is reproduced in the aforementioned storage and reproduction system, it is desirable to provide a special reproduction processing function corresponding to fast feed and rewinding. In this case, it is necessary to selectively reproduce a sequence of access units (access units of video data) which becomes a subject of special reproduction, among the stored video data.

According to the aforementioned conventional storage and reproduction system, time information originally given to the selected access units becomes discontinuous. If an MPEG decoding device is made to conduct ordinary decoding processing by using such time information, contradiction occurs on the time axis. For a stream comprised of the aforementioned access units, therefore, it is necessary to set a different time axis and newly provide time information.

As the approach, such a configuration can be considered that elementary stream (ES) constituted by only an access unit to be reproduced specially is extracted from the TS packet sequence of video data at a time of special reproduction and decoding processing is performed using this ES. However, in such an approach, it is necessary to provide a decoder for decoding the ES in a dedicated manner, which results in lack in versatility of MPEG system.

As a technique therefor, it is conceivable to rewrite field portions of originally given time information with such time information as to be suitable for special reproduction while maintaining the form of the original stream of the video data at the time of special reproduction. However, since such a technique is processing of simply rewriting the original time information with new time information, it becomes necessary to locate the position of the field portion to be rewritten. In this case, it becomes necessary to, for example, eliminate dispersion of time required to locate the position. Thus, time management when determining the new time information becomes very complicated. Difficulty in ensuring the accuracy on the time axis poses a problem.

SUMMARY OF THE INVENTION

In view of such a problem, therefore, the present invention has been made. An object of the present invention is to provide a transport stream multiplexing method capable of maintaining coordination on the time axis by using simple processing without causing more complicated configuration, even in the case where a transport stream is provided with new time information when multiplexing encoded data.

The above object of the present invention can be achieved by the following multiplexing method of transport stream for multiplexing encoded data and forming a transport stream. The multiplexing method is provided with the processes of: generating process of generating time information for said transport stream; controlling process of controlling transfer timing of access units so as to conform to said time information, said access units being units of access of encoded data; and multiplexing process of multiplexing said access units and said time information, and forming said transport stream.

According to the present invention, when conducting transfer control on encoded data every access unit, a transport stream is formed by newly generating time information, controlling transfer timing of access units so as to conform to the time information, and multiplexing access units and time information. Therefore, desired timing according to a condition such as special reproduction can be set on the transport stream without depending on time information added to original stream of the encoded data. Time management can be conducted easily.

In one aspect of the multiplexing method of the present invention, said time information contains time reference information that provides a time reference of said transport stream and reproduction time information that stipulates reproduction time of said access units.

According to the present invention, a time reference acquired from time reference information is compared with reproduction time information, on the basis of the time information as described above, and reproduction time of access units is determined. Therefore, it is possible to accurately set the timing of decoding and transfer every access unit. It is thus possible to conduct time management conforming to special reproduction or the like more easily.

In another aspect of the multiplexing method of the present invention, said time information contains time reference information that provides a time reference of said transport stream and reproduction time information that stipulates reproduction time of said access units. And the reproduction time information is a PTS (Presentation Time Stamp) embedded in a PES (Packetized Elementary Stream) header of a PES packet.

According to the present invention, reproduction time information given to the transport stream is a PTS transmitted in a PES packet. By the PTS corresponding to the access unit, therefore, time setting and change for access units can be simplified.

In further aspect of the present invention, said time information contains time reference information that provides a time reference of said transport stream and reproduction time information that stipulates reproduction time of said access units. The reproduction time information is a PTS (Presentation Time Stamp) embedded in a PES header of a PES packet. The transfer timing of said access units and transfer timing of PES headers each having said PTS(Presentation Time Stamp) embedded are controlled so as to be able to be switched based on an enable signal.

According to this aspect, an enable signal is distinguished in transfer processing of each access unit, and transfer timing of access units and transfer timing of PES headers having a PTS embedded therein are switched over and controlled by the enable signal. Even in the case where a large number of access units and PES headers, which are elements of a transport stream, are transferred on the time axis, therefore, transfer control can be conducted easily.

In further aspect of the present invention, wherein said time information contains time reference information that provides a time reference of said transport stream and reproduction time information that stipulates reproduction time of said access units and each of said access units is newly provided with a parameter that gives a storage quantity of a virtual input buffer at time of reproduction or decoding timing.

According to this aspect, the storage quantity or decoding timing of a virtual input buffer is indicated by a parameter given to an access unit and consequently the transfer operation of access units can be controlled by using the parameter. By suitably using the parameter and the PTS, therefore, transfer timing of respective access units can be determined more suitably.

In further aspect of the present invention, wherein said time information contains time reference information that provides a time reference of said transport stream and reproduction time information that stipulates reproduction time of said access units, each of said access units is newly provided with a parameter that gives a storage quantity of a virtual input buffer at time of reproduction or decoding timing and said parameter is set to a fixed value with due regard to a transfer time of said access unit having a maximum data quantity.

According to this aspect, a parameter given to access units is set to such a fixed value that a transfer time can be ensured when the data quantity of the access unit becomes maximum. Therefore, it is possible to prevent such a situation by using simple processing that access units after transfer are not in time for the decoding and display processing.

In further aspect of the present invention, wherein said time information contains time reference information that provides a time reference of said transport stream and reproduction time information that stipulates reproduction time of said access units, each of said access units is newly provided with a parameter that gives a storage quantity of a virtual input buffer at time of reproduction or decoding timing and said parameter is set to a variable value with due regard to transfer time values of said access units.

According to this aspect, a parameter given to access units is set to such a variable value that the transfer time can be always ensured when the data quantity of the access units varies. Therefore, it is possible to prevent such a situation by using simple processing that access units after transfer are not in time for the decoding and display processing. The transfer efficiency of the access units can be increased.

In further aspect of the present invention, said transport stream is transmitted as packets by taking a TS(Transport Stream) packet as unit.

According to this aspect, a transport stream is formed by sending packets by taking a TS packet as the unit. Therefore, it is possible to generate reproduction time information on the basis of the arrival time information of TS packets. The time management can be conducted more easily.

In further aspect of the present invention, said transport stream is transmitted as packets by taking a TS(Transport Stream) packet as unit. The TS(Transport Stream) packets includes TS packets each formed of only time information.

According to this aspect, TS packets formed of only time information are included in the transport stream. Therefore, it is possible to form a packet of each time information independently of the position on the original stream, and output each time information at independent timing within a range satisfying standards. As a result, the time management in the transport stream can be facilitated.

The above object of the present invention can be achieved by the following multiplexing method of transport stream for multiplexing encoded data and forming a transport stream. The multiplexing method is provided with the processes of: generating According to the present invention, when conducting transfer control on encoded data every access unit, a transport stream is formed by newly generating time information, controlling transfer timing of access units so as to conform to the time information, and multiplexing access units and time information. Therefore, desired timing according to a condition such as special reproduction can be set on the transport stream without depending on time information added to original stream of the encoded data. Time management can be conducted easily.

In one aspect of the multiplexing apparatus of the present invention, said time information contains time reference information that provides a time reference of said transport stream and reproduction time information that stipulates reproduction time of said access units.

According to the present invention, a time reference acquired from time reference information is compared with reproduction time information, on the basis of the time information as described above, and reproduction time of access units is determined. Therefore, it is possible to accurately set the timing of decoding and transfer every access unit. It is thus possible to conduct time management conforming to special reproduction or the like more easily.

In another aspect of the multiplexing apparatus of the present invention, said reproduction time information is a PTS(Presentation Time Stamp) embedded in a PES header of a PES packet.

According to the present invention, reproduction time information given to the transport stream is a PTS transmitted in a PES packet. By the PTS corresponding to the access unit, therefore, time setting and change for access units can be simplified.

In furher aspect of the multiplexing apparatus of the present invention, said reproduction time information is a PTS(Presentation Time Stamp) embedded in a PES header of a PES packet and transfer timing of said access units and transfer timing of PES headers each having said PTS(Presentation time stamp) embedded are controlled so as to be able to be switched based on an enable signal.

According to this aspect, an enable signal is distinguished in transfer processing of each access unit, and transfer timing of access units and transfer timing of PES headers having a PTS embedded therein are switched over and controlled by the enable signal. Even in the case where a large number of access units and PES headers, which are elements of a transport stream, are transferred on the time axis, therefore, transfer control can be conducted easily.

In further aspect of the multiplexing apparatus of the present invention, said time information contains time reference information that provides a time reference of said transport stream and reproduction time information that stipulates reproduction time of said access units and, each of said access units is provided with a parameter that gives a storage quantity of a virtual input buffer at time of reproduction or decoding timing.

According to this aspect, the storage quantity or decoding timing of a virtual input buffer is indicated by a parameter given to an access unit and consequently the transfer operation of access units can be controlled by using the parameter. By suitably using the parameter and the PTS, therefore, transfer timing of respective access units can be determined more suitably.

The above object of the present invention can be achieved by the following a storage and reproduction system. The storage and reproduction system for conducting storage processing and reproduction processing of a transport stream obtained by multiplexing encoded data, said storage and reproduction system is provided with a multiplexing device for multiplexing said encoded data; and a forming device for forming a transport stream by using a multiplexing method comprising the processes of: generating process of generating time information for said transport stream; controlling process of controlling transfer timing of access units so as to conform to said time information, said access units being units of access of encoded data; and multiplexing process of multiplexing said access units and said time information, and forming said transport stream.

According to the present invention, the above described multiplexing method can be applied to a storage and reproduction system. A storage and reproduction system capable of conducting time management on a transport stream easily can be implemented.

DETAILED DESCRIPTION OF THE PREFERRED EMBODIMENTS

Hereafter, a preferred embodiment of the present invention will be described by referring to the drawing.

Figure 1:
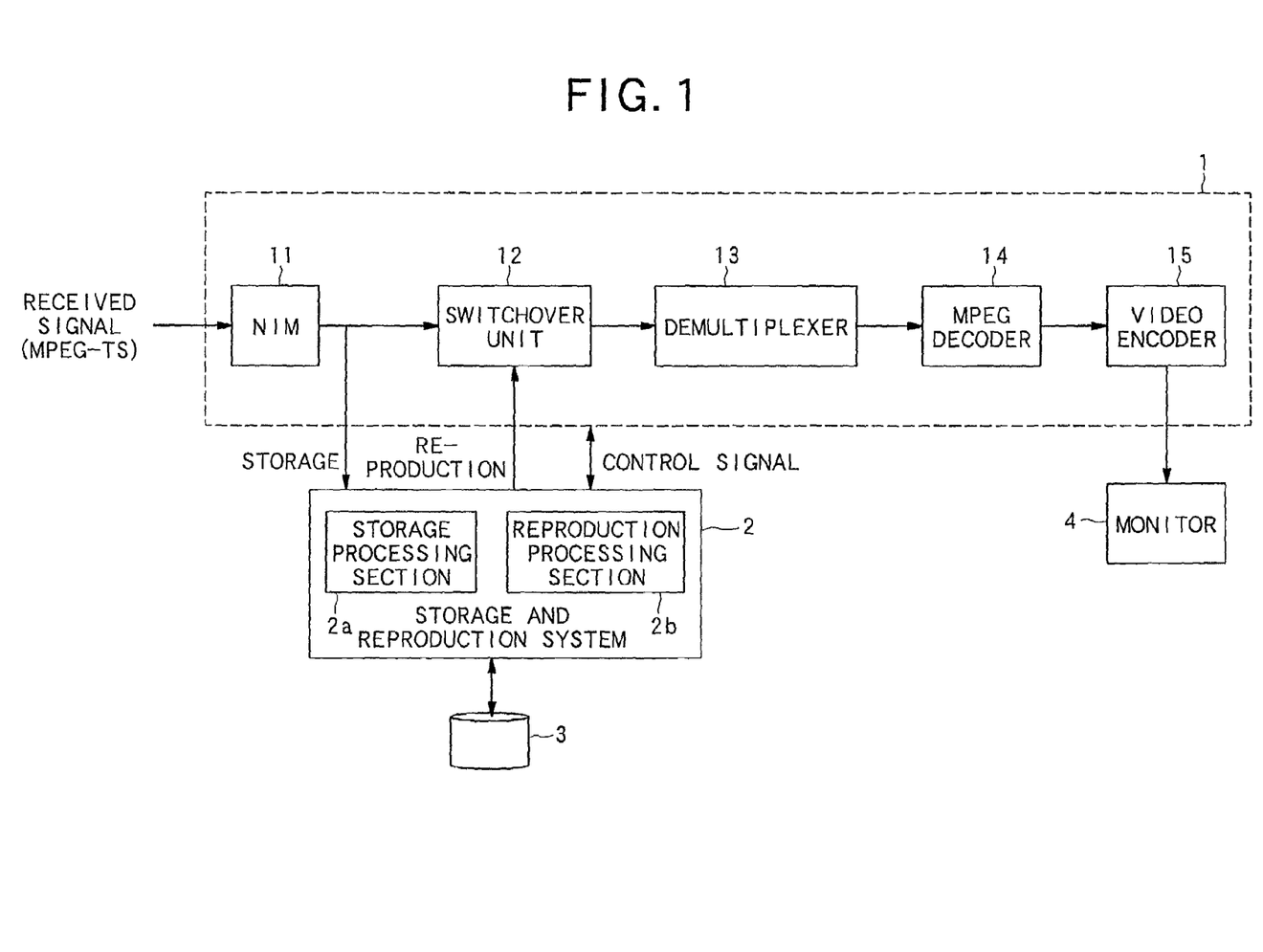
FIG. 1 is a block diagram showing a general configuration of a digital broadcasting reception system including a storage and reproduction system as an example to which the present invention is applied.

FIG. 1 is a block diagram showing a general configuration of a digital broadcasting reception system including a storage and reproduction system as an example to which the present invention is applied. The digital broadcasting reception system shown in FIG. 1 includes a digital broadcasting reception section 1 for receiving an MPEG-TS sent out as digital broadcasting, a storage and reproduction system 2 for controlling storage processing and reproduction processing of the received MPEG-TS, a storage medium 3 serving as storage unit of the MPEG-TS, and a monitor 4 serving as display unit of images output on the basis of the MPEG-TS.

The MPEG-TS in the present embodiment is comprised of a plurality of programs of digital broadcasting. The MPEG-TS is formed by multiplexing streams corresponding to a plurality of programs. As a reception signal received in the digital broadcasting reception section 1, various forms such as a digital broadcasting signal transmitted from satellite broadcasting by an electric wave are used. In FIG. 1, the digital broadcasting reception section 1 and the storage and reproduction system 2 are formed so as to transmit and receive various control signals in order to mutually send out operation orders.

In FIG. 1, the digital broadcasting reception section 1 includes an NIM (Network Interface Module) 11, a switchover unit 12, a demultiplexer 13, an MPEG decoder 14, and a video encoder 15. In the configuration heretofore described, the NIM 11 conducts demodulation processing and error correction processing on the reception signal of digital broadcasting received from the outside via a network, and extracts an MPEG-TS on real time.

The MPEG-TS output from the NIM 11 is supplied to the switchover unit 12 and the storage and reproduction system 2. In other words, it is possible to send out the MPEG-TS from the NIM 11 via the switchover unit 12 and display the digital broadcasting in a real time image, and in addition store a desired MPEG-TS in the storage medium 3 by using the storage and reproduction system 2.

The storage and reproduction system 2 includes a storage processing section 2a and a reproduction processing section 2b. The storage processing section 2a analyzes the MPEG-TS output from the NIM 11, and conducts storage processing for the storage medium 3. The reproduction processing section 2b conducts reproduction processing of an MPEG-TS stored in the storage medium 3, reconstruct the MPEG-TS to be reproduced. A configuration and operation of the reproduction processing section 2b will be described later in detail.

The switchover unit 12 selects either an MPEG-TS supplied from the NIM 11 or a reproduction MPEG-TS reproduced in the storage and reproduction system 2, and outputs the selected MPEG-TS. At this time, the user can conduct predetermined operation on operation unit (not illustrated), and selectively set either the MPEG-TS supplied from the NIM 11 or the reproduced MPEG-TS supplied from the storage and reproduction system 2.

The demultiplexer 13 extracts data of a specific program having a program number that has been set, from among a plurality of multiplexed programs. Or the demultiplexer 13 separates video data and audio data that form respective programs into components and outputs extracted encoded data.

In the present embodiment, the MPEG scheme is used as the data compression encoding scheme. In the MPEG decoder 14, therefore, expansion processing using the MPEG system is conducted on the encoded data output from the demultiplexer 13. Expanded data output from the MPEG decoder 14 is converted to a predetermined format by the video encoder 15. The converted output is output to the externally connected monitor 4 to form a display image.

The storage and reproduction system shown in FIG. 1 is an example of the case where the present invention is applied. The present invention can also be applied widely to a system of another form having a configuration of conducting multiplexing and transmission to form a transport stream.

Transfer operation controlled by the reproduction processing section 2b in the present embodiment will now be described concretely. A transfer subject in the reproduction processing section 2b is an access unit which becomes the unit of access at the time of decoding and reproduction. One picture data among video data of the MPEG system is associated with one access unit. On the basis of operation hereafter described, the reproduction processing section 2*b* newly generates suitable time information corresponding to, for example, special reproduction processing, reconstructs a TS packet sequence containing the time information, and outputs the reconstructed packet sequence to the outside.

Figure 2:
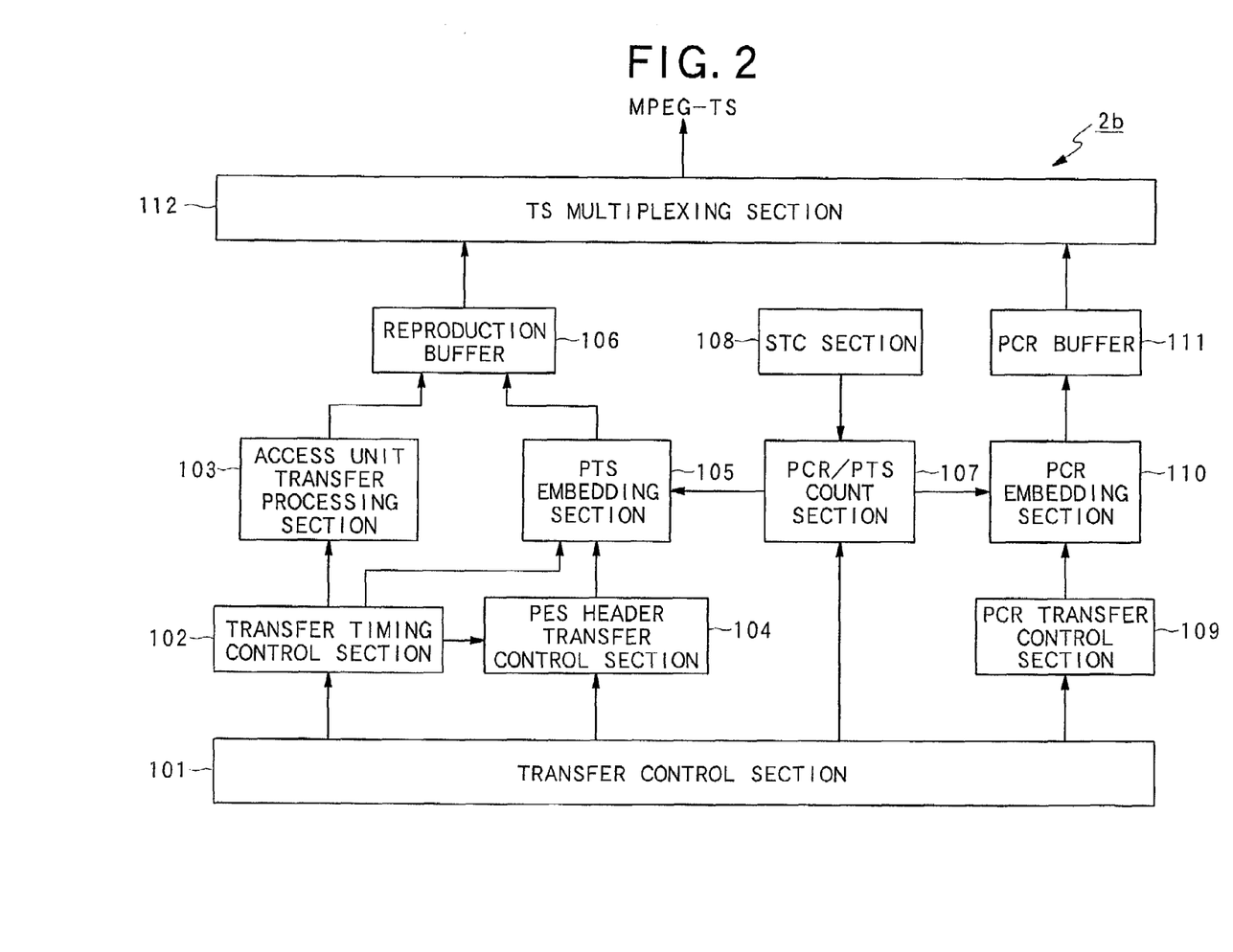
FIG. 2 is a block diagram showing a concrete configuration of a reproduction processing section.

FIG. 2 is a block diagram showing a concrete configuration of the reproduction processing section 2*b*. As shown in FIG. 2, the reproduction processing section 2*b* includes a transfer control section 101, a transfer timing control section 102, an access unit transfer processing section 103, a PES header transfer control section 104, a PTS embedding section 105, a reproduction buffer 106, a PCR/PTS count section 107, an STC section 108, a PCR transfer control section 109, a PCR embedding section 110, a PCR buffer 111, and a TS multiplexing section 112.

In the configuration heretofore described, the transfer control section 101 controls operation of respective components of the reproduction processing section 2*b*. In the present embodiment, a desired access unit among video data retained in a hard disk device (the storage medium 3 of FIG. 1) is read out selectively, and handled as the subject of transfer processing as described later.

The transfer timing control section 102 receives the access unit of the transfer subject from the transfer control section 101, and controls timing of its transfer start and timing of decoding and display. For that purpose, the transfer timing control section 102 sets a PTS offset value needed to calculate a PTS (Presentation Time Stamp) that prescribes display time (reproduction time) of each access unit, and generates a PTS enable signal that gives such an interval that the PTS can become effective to each access unit, i.e., a PTS packet transfer enable interval. The PTS offset value and the PTS enable signal will be described later in detail.

The PTS is a time stamp that represents the decoding and display timing of each access unit on the time axis of an STC (System Time Clock). The PTS is given on the basis of a PCR (Program Clock Reference) transferred separately. By the way, the STC is a system clock used for time synchronization of the MPEG, the PCR is time reference information in the MPEG.

The access unit transfer processing section 103 receives the access unit of the transfer subject from the transfer timing control section 102, removes unnecessary time information given to the original stream, reconstructs a TS packet sequence, and transfers the TS packet sequence. If time information such as the PCR or PTS contained in the original video data or a DTS (Decoding Time Stamp) that prescribes decoding timing of each access unit remains in a system of such a form having special reproduction control, it becomes a factor causing timing contradiction at the time of reproduction. Therefore, old time information needs to be eliminated. In addition, the TS packet sequence is provided with new time information by processing described later.

There is a convention that PTS=DTS is established in the case where data interchange is not caused at the time of decoding. In special reproduction as in the present embodiment, it is not necessary to consider the DTS.

The PES header transfer control section 104 controls the transfer operation of a PES header for describing the PTS. Transfer timing of the PES header in the PES header transfer control section 104 is determined on the basis of the PTS enable signal supplied from the transfer timing control section 102.

With respect to the access unit of the transfer subject, the PTS embedding section 105 calculates a PTS that conforms to a PTS offset value supplied from the transfer timing control section 102, on the basis of a count value corresponding to the PTS in the PCR/PTS count section 107 described later. And the PTS calculated in the PTS embedding section 105 is embedded in the PES header added to the TS packet sequence by the PES header transfer control section 104.

The reproduction buffer 106 is storage unit for receiving a TS packet sequence corresponding to the access unit and a TS packet sequence corresponding to the PES header, and temporarily buffering them. The reproduction buffer 106 outputs a TS packet sequence to the TS multiplexing section 112 at predetermined timing when multiplexing MPEG-TSs.

The PCR/PTS count section 107 counts STCs supplied from the STC section 108, and outputs a count value corresponding to the PTS to the PTS embedding section 105. In addition, the PCR/PTS count section 107 outputs a count value corresponding to the PCR to the PCR embedding section 110. The STC is a clock signal of 27 MHz, and is prescribed so as to provide a predetermined time on the STC time axis serving as a reference in the MPEG. The count value in the PCR/PTS count section 107 is reset when a reset signal is supplied from the transfer control section 101.

The PCR transfer control section 109 controls the transfer section of the PCR. By the way, since the transfer timing of the PCR is determined so as to be conducted at time intervals of 0.1 second or less as standards, TS packets for the PCR are sent out from the PCR transfer control section 109 so as to meet the time intervals.

The PCR embedding section 110 derives the PCR on the basis of the count value corresponding to the PCR in the PCR/PTS count section 107, receives the TS packets from the PCR transfer control section 109, embedding the PCR in their adaptation fields (AFs), and outputs the resulting PCR.

The PCR buffer 111 is storage unit for temporarily buffering the TS packets, which carry the PCR, output from the PCR embedding section 110. The PCR buffer 111 outputs the TS packets to the TS multiplexing section 112 at predetermined timing.

The TS multiplexing section 112 arbitrates sending timing of TS packets of the reproduction buffer 106 and the PCR buffer 111, forms a continuous MPEG-TS by using input TS packet sequences, and outputs the MPEG-TS. If at this time sending timing overlap occurs, then the TS multiplexing section 112 sets high priority for the PCR buffer 111 in order to ensure accurate time reference, and preferentially outputs TS packets having the PCR embedded therein. As shown in the configuration of FIG. 1, the MPEG-TS obtained by thus multiplexing is transmitted from the reproduction processing section 2*b* to the digital broadcasting reception section 1 and finally displayed on the monitor 4 as an image.

Figure 3:
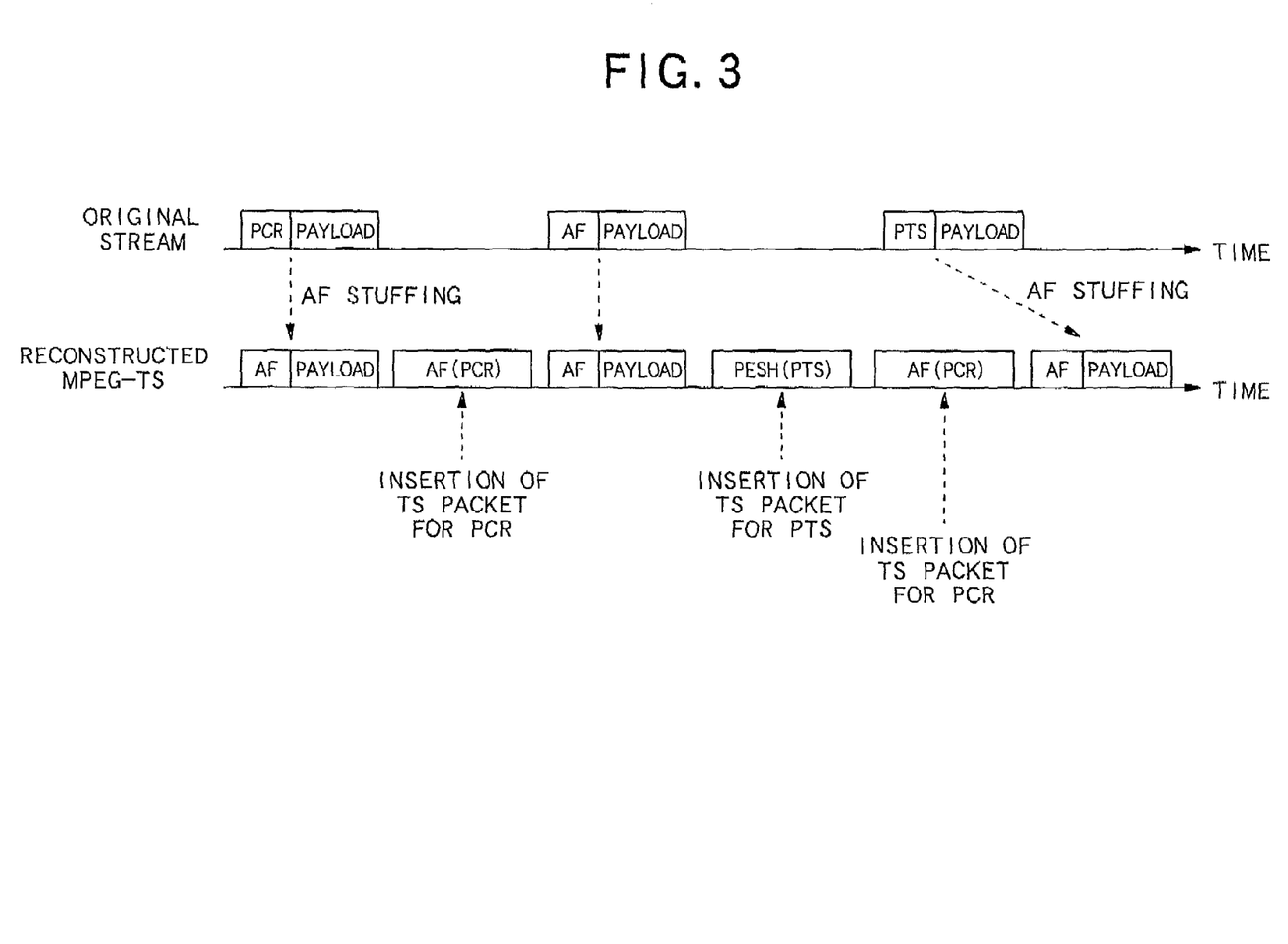
FIG. 3 is a diagram showing a configuration of a MPEG-TS multiplexed in the reproduction processing section.

FIG. 3 is a diagram showing an MPEG-TS obtained by multiplexing in the reproduction processing section 2*b* as described above. On the upper side of FIG. 3, a TS packet sequence of the original stream is shown. On the lower side of FIG. 3, a TS packet sequence of the MPEG-TS formed in the reproduction processing section 2*b* is shown. Every TS packet has a data length of a fixed length of 188 bytes, and includes an adaptation field (AF) for transmitting control information and a payload for transmitting a data main body.

In the case of the original stream, the data main body is written into the payload of each TS packet, and the PCR is written in adaptation fields of TS packets at predetermined time intervals. Furthermore, the PTS and DTS are written in a PES header located immediately after the TS header, at predetermined time intervals. On the other hand, in the case of the MPEG-TS reconstructed in the present embodiment, a selected access unit is extracted from the original stream, and written into a payload to form TS packets. Unnecessary PCR, PTS and DTS contained in the original stream are removed. At this time, portions corresponding to the old PCR, PTS and DTS are filled up by AF stuffing. And by inserting a TS packet having a new PCR written into the adaptation field thereof and a TS packet including the PES header (PESH) having a new PTS written therein are inserted into a TS packet sequence corresponding to access units, at predetermined timing, a reconstructed MPEG-TS is output.

Figure 4:
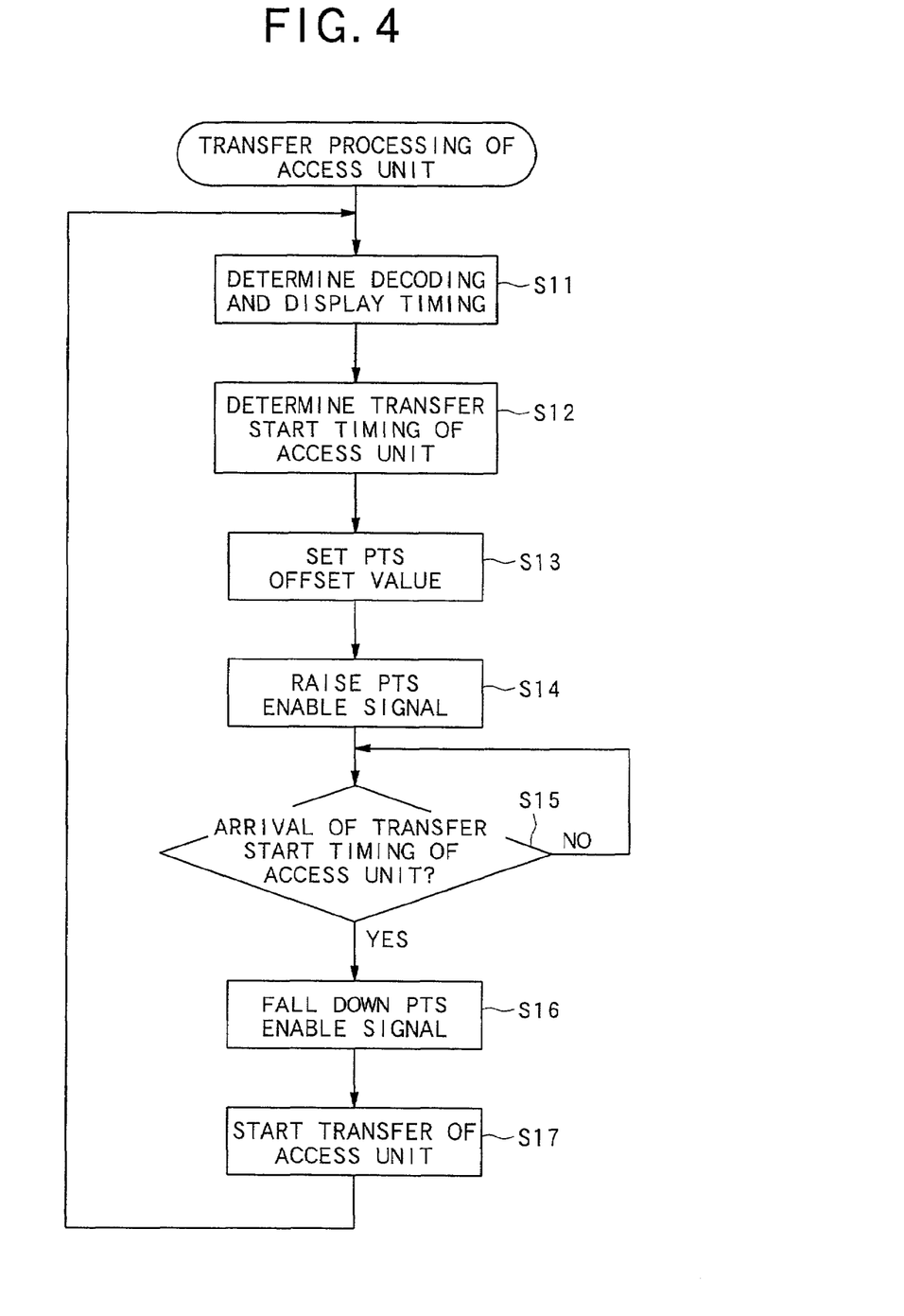
FIG. 4 is a flow chart showing an outline of transfer processing of an access unit.
Figure 5:
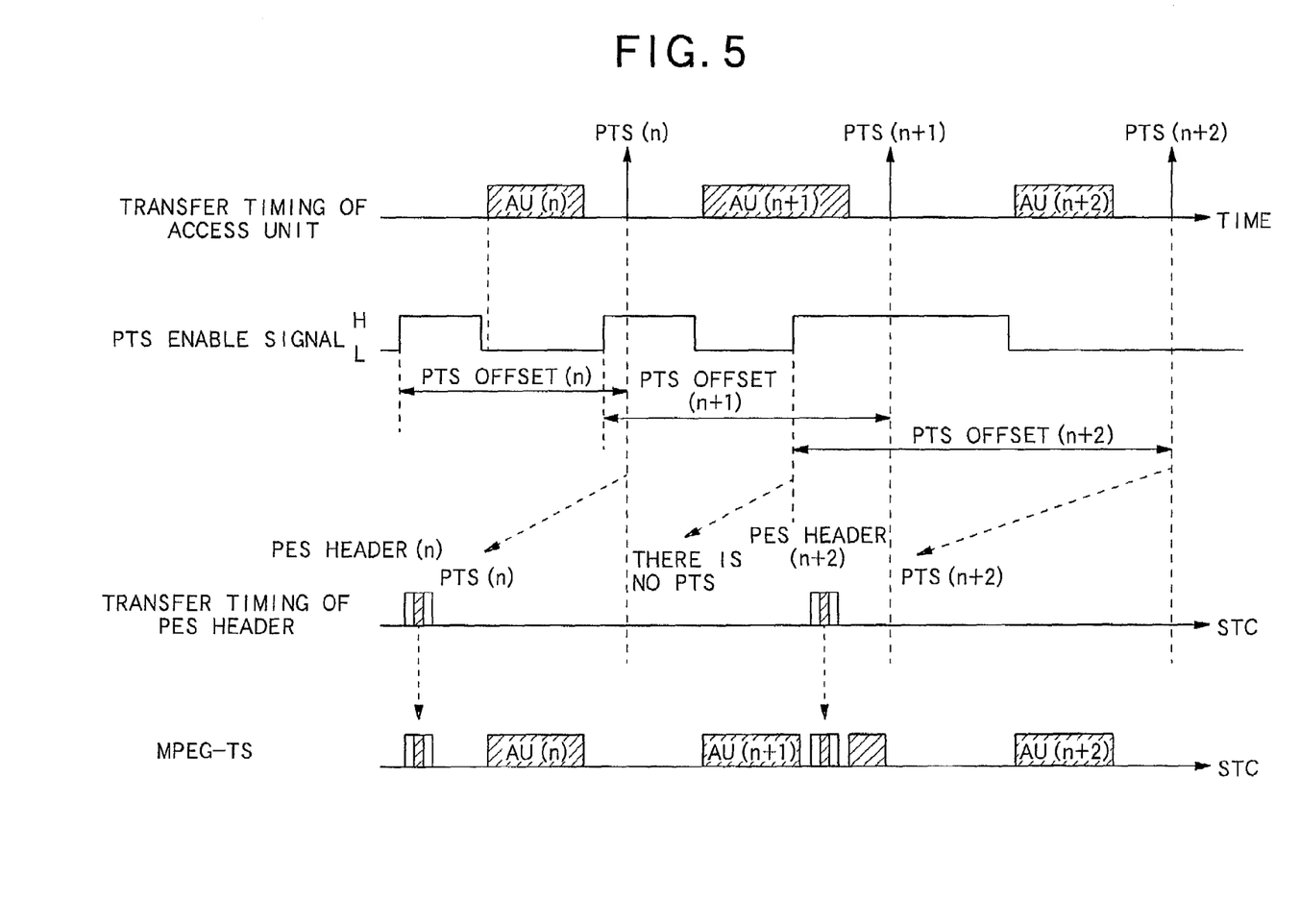
FIG. 5 is a diagram showing timing at the time of transfer in the reproduction processing section.

Concrete transfer processing of access units in the reproduction processing section 2b will now be described by referring to FIG. 4 and FIG. 5. FIG. 4 is a flow chart showing an outline of transfer processing of an access unit. FIG. 5 is a diagram showing timing at the time of transfer in the reproduction processing section 2b.

If the transfer processing shown in FIG. 4 is started, decoding and display timing of an access unit selected as the subject of reproduction is determined in the transfer timing control section 102 (step S11). The decoding timing and display timing are determined suitably so as to correspond to the reproduction condition. For example, in the case of special reproduction, however, the decoding timing and display timing may be determined on the basis of reproduction speed corresponding to fast feed and rewinding. By the way, since the time required for decoding processing is sufficiently short as compared with the transfer time, the actual decoding timing and display timing i.e., reproduction time may be regarded and handled as nearly the same timing.

Transfer start timing for the access unit to be reproduced is determined (step S12). To be concrete, it is possible to calculate the time required for transfer on the basis of the data quantity of the access unit and the transfer bit rate, and determine transfer start timing from among such time points that the transfer can be completed by the decoding and display timing of the access unit with due regard to a moderate margin, on the basis of the result of calculation.

Subsequently, a PTS offset value corresponding to the transfer start timing determined as described above is set (step S13), and the PTS enable signal is raised from the low level to the high level (step S14). The PTS offset value represents a time interval between the time point when the PTS enable signal has become a high level and the time point indicated by the PTS. As a result, the PTS embedding section 105 can calculate the PTS on the STC time axis.

By referring to FIG. 5, the relationship between the PTS enable signal and the PTS offset value is described. On the upper side of FIG. 5, transfer timing of each access unit (AU) is shown together with timing of corresponding PTS. In FIG. 5, three access units successively provided with number n to n+2 are exemplified. Transfer of each access unit to the decoder side needs to be completed at least by timing prescribed by the PTS. The time required for transfer is determined depending upon the data quantity and the transfer bit rate. Therefore, the transfer start timing and the transfer completion timing of each access unit can be determined.

When the PTS enable signal is a high level in FIG. 5, transfer of a PES header having a PTS embedded therein is permitted. On the other hand, when the PTS enable signal is a low level, transfer of an access unit is permitted. It will be appreciated that a time point when time indicated by the PTS offset value has elapsed from a time point of rise of each PTS enable signal from the low level to the high level accurately coincides with the timing of the PTS.

For example, if it is first detected in FIG. 5 that the PTS enable signal becomes a high level, then the state is judged to be such a state that an effective PTS offset (n) has been set, and its value is read out. If the time when the PTS enable signal has become the high level is represented by a PCR value (H-edge), then PTS(n) can be calculated by the following equation.

$$PTS(n)=PCR \text{ value } (H\text{-edge})+PTS \text{ offset } (n)$$

And the calculated PTS(n) is embedded in the PES header by the PTS embedding section 105.

In FIG. 4, arrival of the transfer start timing of the access unit is monitored (step S15). Since processing described later is conducted prior to the transfer of the access unit, it is necessary to judge timing that slightly precedes the transfer start timing. If the decision result of the step S15 is "NO", arrival of the transfer start timing continues to be monitored.

On the other hand, when the decision result has become "YES", the PTS enable signal is lowered from the high level to the low level (step S16). Subsequently, transfer operation of the access unit of the transfer subject is started (step S17). Thereafter, transfer of the access unit is completed at the time point when the time required for the transfer has elapsed. In order to conduct transfer processing of a subsequent access unit, the processing returns to the step S11 and similar processing is repeated.

As appreciated by taking the transfer of the access unit (n) of FIG. 5 as an example, the transfer of the access unit (n) is started at the time point when a slight time has elapsed from the timing of first falling of the PTS enable signal. And for a predetermined interval from the transfer start of the access unit (n), the PTS enable signal is kept at the low level. As for subsequent access units as well, similar relations hold true.

Figure 6:
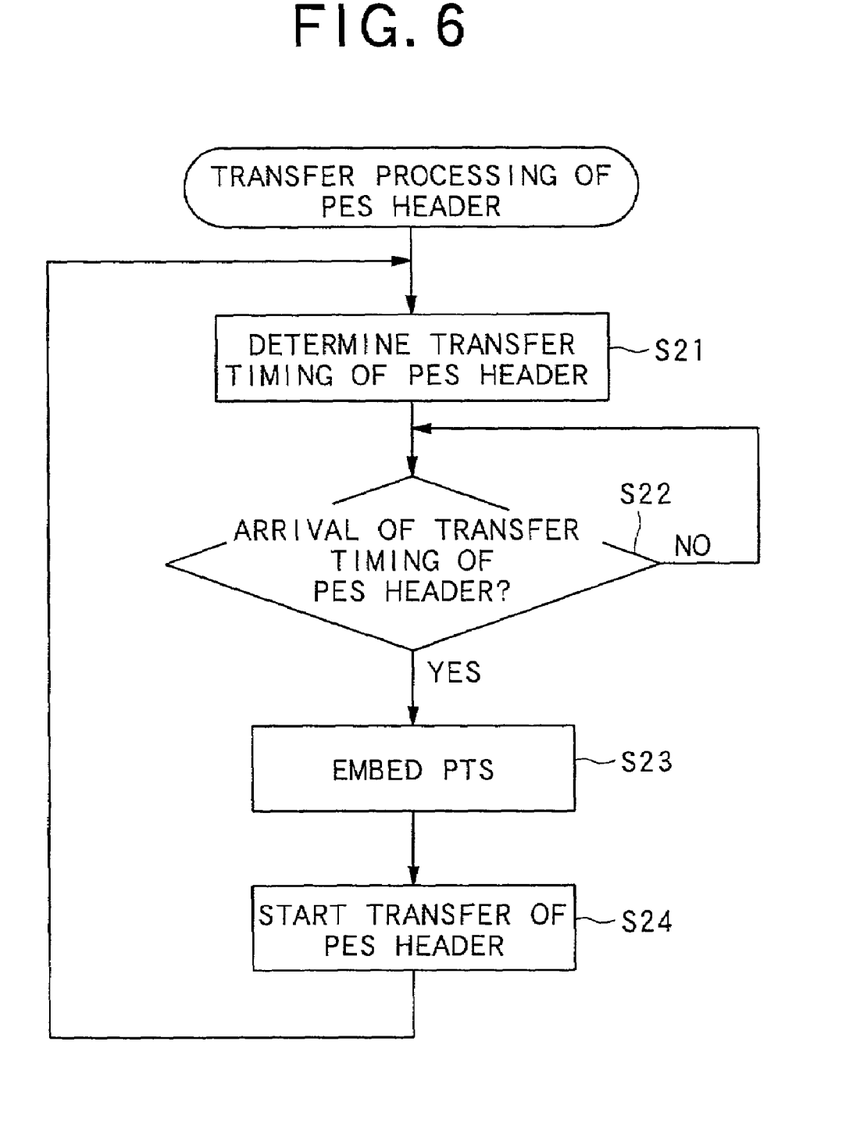
FIG. 6 is a flow chart showing an outline of concrete transfer processing of a PES header containing a PTS.

Concrete transfer processing of the PES header containing the PTS in the reproduction processing section 2b will now be described by referring to FIG. 5 and FIG. 6. FIG. 6 is a flow chart showing an outline of concrete transfer processing of the PES header containing the PTS.

Upon start of the processing shown in FIG. 6, transfer timing of the PES header containing the PTS that is set in the access unit selected as the reproduction subject is determined (step S21). For the PTS, a predetermined sending interval is determined. To be concrete, it is determined to be 0.7 second or less. So long as such a sending interval is satisfied, therefore, it is not necessary to send the PTS of every access unit. As for access units for which the PTS is not sent, the decoding and display timing of the access unit is derived on the decoding side by using a parameter vbv_delay described later.

Subsequently, arrival of the transfer timing of the PES header determined at the step S21 is monitored (step S22). When the PTS enable signal is the high level, transfer of the PES header is permitted as described above. In the example shown in FIG. 5, transfer timing of PES header (n) for sending PTS(n) that corresponds to the nth access unit and PES header (n+2) for sending PTS(n+2) that corresponds to the (n+2)th access unit is shown. In the case of FIG. 5, PTS(n+1) that corresponds to the access unit (n+1) in the middle is not sent.

If the decision result of the step S22 is "NO", then arrival of the transfer timing of the PES header continues to be monitored. On the other hand, if the decision result of the step S22 is "YES", the PTS calculated as described above is embedded in the PES header (step S23). For example, in the case of FIG. 5, it will be appreciated that the PES header (n)

having PTS(n) embedded therein is sent and after elapse of a predetermined time the PES header (n+2) having PTS(n+2) embedded therein is sent.

Subsequently, transfer operation of the PES header is started (step S24). Thereafter, transfer of the PES header is completed at the time point when the time required for the transfer has elapsed. In order to conduct transfer processing of a PES header containing the next PTS, the processing returns to the step S21 and similar processing is repeated.

After each transfer processing shown in FIG. 4 and FIG. 6, packets each containing an access unit and packets each containing a PES header are multiplexed in the MPEG-TS formed in the TS multiplexing section 112, and transferred to the decoder side, as shown in the lower part of FIG. 5. In the example of FIG. 5, the transfer timing of the access unit (n+1) and the transfer timing of the PES header (n+2) overlap with each other. Therefore, the PES header (n+2) is inserted in the middle of the access unit (n+1).

A method of calculating the parameter vbv_delay in the present embodiment will now be described by referring to FIGS. 7A and 7B. The vbv_delay is a parameter that represents a storage quantity of a virtual input buffer at the time when reproducing an access unit, by means of time. The parameter vbv_delay is used to acquire the decoding and display timing of an access unit as described above. The parameter vbv_delay is written into a vbv_delay field contained in a picture header of a picture corresponding to each access unit.

Figure 7A:
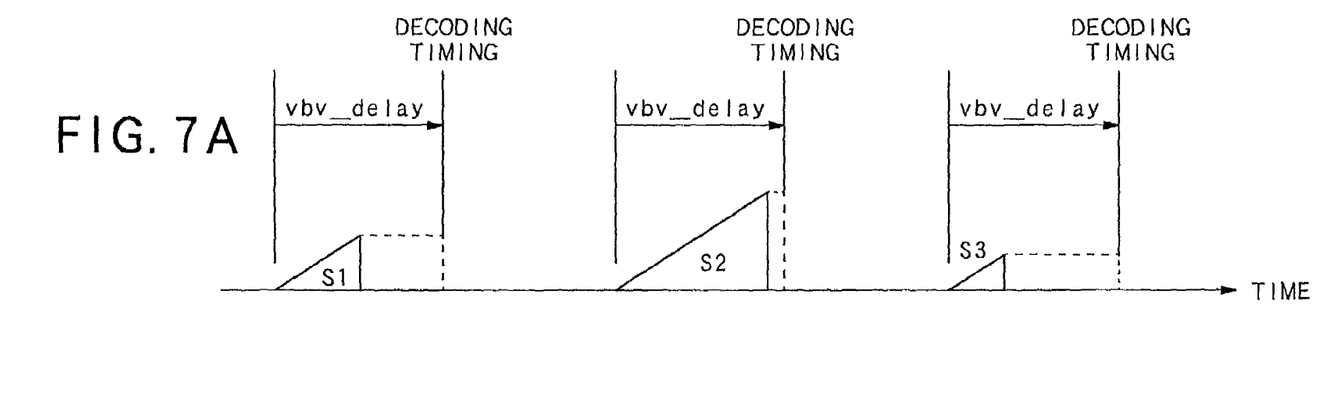
FIG. 7A is a diagram showing a method for calculating a parameter vbv_delay in the present embodiment.
Figure 7B:
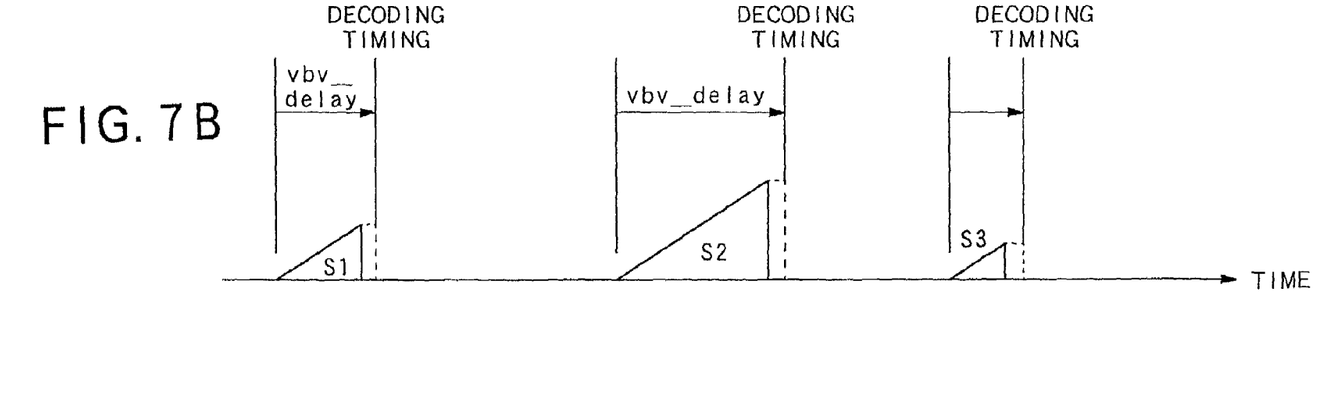
FIG. 7B is a diagram showing a method for calculating a parameter vbv_delay in the present embodiment.

In FIGS. 7A and 7B, two examples are shown as the calculation method of vbv_delay. In both cases of these two examples, transfer of an access unit is started at timing that precedes the decoding timing of an access unit by time indicated by vbv_delay as shown in FIGS. 7A and 7B. In FIGS. 7A and 7B, a gradual increase of data quantity between the start and end of the access unit transfer is represented by a triangle.

In a first calculation example shown in FIG. 7A, vbv_delay is set to a fixed value. The parameter vbv_delay is set to a value obtained by considering the case where the data quantity of the access unit assumes its maximum possible value. According to ISO/IEC 13818-2, the maximum value of the size of the virtual input buffer of vbv_delay is determined to be 1.8 Mbits in the case of MP@ML (main profile/main level). By using this, therefore, vb_delay according to the first calculation example can be derived by the following equation $$vbv\_delay=((1.8M/R)+a) \times 90 \text{ kHz}, \quad (1)$$

where
R=sending bit rate at the time of reproduction (bits/sec)
a=predetermined margin (time).

By the way, 90 kHz in the equation (1) is equivalent to a frequency obtained by conducting frequency division on the system clock of 27 MHz at a ratio of 300, and it is used as a reference when using vbv_delay. As for the margin "a" in the equation (1), a suitable value corresponding to the variation range of the sending bit rate R is set. The margin "a" is provided with due regard to the case where a delay on the actual operation is caused due to some factor and consequently the transfer completion timing is delayed.

In the first calculation example represented by the equation (1), there is no need to change the value of vbv_delay even in the case where the data quantity of the access unit is different. As a result, the processing can be simplified. In the example of FIG. 7A, such a vbv_delay that an access unit having a maximum data quantity is set for three access units having different data quantities. It will be appreciated that a sufficient transfer time margin is ensured for other access units.

In a second calculation example shown in FIG. 7B, the value of vbv_delay is set to be variable. A suitable value calculated according to the data quantity of each access unit is set. The value of vbv_delay according to the second calculation example can be derived by using the following equation.

$$vbv\_delay=((D/R)+a) \times 90 \text{ kHz}, \quad (2)$$

where
D=data quantity of access unit of transfer subject (bits)
a=predetermined margin By the way, meanings of R and 90 Hz in the equation (2) are the same as those in the equation (1). The margin "a" in the equation (2) need not be the same value as that in the equation (1).

In the case where the data quantity of the access unit is different, the value of vbv_delay is changed so as to conform thereto, in the second calculation example represented by the equation (2). Therefore, a large number of access units can be transferred and decoded within a predetermined time, and the processing efficiency can be increased. It will be appreciated that vbv_delay is individually set for three access units having different data quantities and an equal transfer time margin is ensured for respective access units.

In the first and second calculation examples, it is desirable that a start code having a predetermined pattern is added to the end of a data portion of an access unit to be transferred. Thereby, it is possible on the decoding side to recognize that the transfer of a specific access unit has been completed.

As heretofore described, by applying a transport multiplexing method according to the present embodiment, it is possible to provide a TS packet sequence with new time information independent of the original stream and transfer access units. As a result, time management of the system is facilitated. Especially in the case of an MPEG system in which complicated timing control is demanded, such as special reproduction, usefulness of the present invention is high. The present invention can be applied to not only, for example, a storage and reproduction system having a special reproduction function as described above, but also various MPEG systems that conduct ordinary stream generation using a more typical MPEG-TS multiplexing apparatus.

In the aforementioned embodiment, there has been described the case where the present invention has been applied to the storage and reproduction system that conduct storage and reproduction of a transport stream subjected to compression encoding using the MPEG scheme. However, the present invention is not limited thereto, but the present invention can be applied widely to systems that multiplex encoded data obtained by using various schemes.

When multiplexing encoded data and forming a transport stream according to the present invention, access units and time information are multiplexed in separate packets while newly generating time information and controlling the transfer timing as heretofore described. By using simple processing without causing complication of the configuration, a multiplexing method of transport stream capable of keeping conformity on the time axis can be implemented.

The entire disclosure of Japanese Patent Application No. 2000-402546 filed on Dec. 28, 2000 including the specification, claims, drawings and summary is incorporated herein by reference in its entirety.

What is claimed is:

1. A multiplexing method of transport stream for multiplexing encoded data and forming a transport stream, said multiplexing method comprising the processes of:
    extracting process of extracting from a storage medium desired access units which are units of access of encoded data for a special reproduction;
    eliminating process of eliminating old time information for said access units;
    generating process of generating time information for said access units;
    controlling process of controlling transfer timing of access units so as to conform to said time information, said access units being units of access of encoded data; and
    multiplexing process of multiplexing said access units and said time information, and forming said transport stream.

2. The multiplexing method of transport stream according to claim 1, wherein said time information contains time reference information that provides a time reference of said transport stream and reproduction time information that stipulates reproduction time of said access units.

3. The multiplexing method of transport stream according to claim 2, wherein said reproduction time information is a PTS (Presentation Time Stamp) embedded in a PBS header of a PBS packet.

4. The multiplexing method of transport stream according to claim 3, wherein transfer timing of said access units and transfer timing of PES headers each having said PTS(Presentation Time Stamp) embedded are controlled so as to be able to be switched based on an enable signal.

5. The multiplexing method of transport stream according to claim 2, wherein each of said access units is newly provided with a parameter that gives a storage quantity of a virtual input buffer at time of reproduction or decoding timing.

6. The multiplexing method of transport stream according to claim 5, wherein said parameter is set to a fixed value with due regard to a transfer time of said access unit having a maximum data quantity.

7. The multiplexing method of transport stream according to claim 5, wherein said parameter is set to a variable value with due regard to transfer time values of said access units.

8. The multiplexing method of transport stream according to claim 1, wherein said transport stream is transmitted as packets by taking a TS(Transport Stream) packet as unit.

9. The multiplexing method of transport stream according to claim 8, wherein TS(Transport Stream) packets includes TS packets each formed of only time information.

10. A multiplexing apparatus of transport stream for multiplexing encoded data and forming a transport stream, said multiplexing apparatus comprising:
    an extracting device for extracting from a storage medium desired access units which are units of access of encoded data for a special reproduction;
    an eliminating device for eliminating old time information for said access units;
    a generating device for generating time information for said access units;
    a controlling device for controlling transfer timing of access units so as to conform to said time information, said access units being units of access of encoded data; and
    a multiplexing device for multiplexing said access units and said time information, and forming said transport stream.

11. The multiplexing apparatus of transport stream according to claim 10, wherein said time information contains time reference information that provides a time reference of said transport stream and reproduction time information that stipulates reproduction time of said access units.

12. The multiplexing apparatus of transport stream according to claim 11, wherein said reproduction time information is a PTS(Presentation Time Stamp) embedded in a PBS header of a PBS packet.

13. A multiplexing apparatus of transport stream according to claim 12, wherein transfer timing of said access units and transfer timing of PBS headers each having said PTS (Presentation time stamp) embedded are controlled so as to be able to be switched based on an enable signal.

14. The multiplexing apparatus of transport stream according to claim 11, wherein each of said access units is newly provided with a parameter that gives a storage quantity of a virtual input buffer at time of reproduction or decoding timing.

15. A storage and reproduction system for conducting storage processing and reproduction processing of a transport stream obtained by multiplexing encoded data, said storage and reproduction system comprising:
    a multiplexing device for multiplexing said encoded data; and
    a forming device for forming a transport stream by using a multiplexing device comprising:
    an extracting device for extracting from a storage medium desired access units which are units of access of encoded data for a special reproduction;
    an eliminating device for eliminating old time information for said access units;
    a generating device for generating time information for said access units;
    a generating device for generating time information for said transport stream;
    a controlling device for controlling transfer timing of access units so as to conform to said time information, said access units being units of access of encoded data; and
    a multiplexing device for multiplexing said access units and said time information, and forming said transport stream.

* * * * *